_United States Patent Office_

3,035,154
Patented May 15, 1962

3,035,154
PROTECTIVE GAS MIXTURE FOR ARC WELDING WITH A FUSIBLE BARE METAL WIRE ELECTRODE
Lothar Wolff, Pullach im Isartal, and Wilhelm Mantel, Munich-Solln, Germany, assignors to Gesellschaft fur Linde's Eismaschinen Aktiengesellschaft, Hollriegelskreuth, near Munich, Germany
No Drawing. Filed June 29, 1959, Ser. No. 823,346
Claims priority, application Germany Oct. 28, 1958
3 Claims. (Cl. 219—74)

In the arc welding of steel with a fusible bare electrode under a protective gas, many processes can be used, characterized by the use of different protective gases or gas mixtures. We know, for example, of the use of noble gases such as argon, helium or mixtures thereof. We also know about welding with argon-oxygen mixtures wherein, as a rule the oxygen does not exceed 5%, to guard against burning up alloy elements. Pure carbon dioxide as well as a carbon dioxide-oxygen mixtures also have been used in welding.

Welding in pure argon has the disadvantage that the molten metal tends to lose its wetting power, balls together and rolls off of the weld under the pressure of the arc, since all metallic melts, when kept clean, have relatively high surface tensions. Chemical attack reduces the surface tension and here we have the possibility, by means of exact dosing of oxygen, to reduce it to the desired extent.

When welding in pure argon and oxygen mixtures, the least variation often results in burning up of the carbon, thereby provoking porosity in the weld. In addition the form of the arc under argon and argon-oxygen mixtures is unfavorable for many welding purposes, because as a result of its very flat contact, it induces lateral bonding defects.

In contrast, in welding with pure carbon dioxide and carbon dioxide-rich mixtures, the danger of pore formation as a result of the production of carbon monoxide does not exist. And lateral bonding defects do not appear, because arcs burning in both pure carbon dioxide and mixtures with high carbon dioxide percentage reveal a very deep penetration over the entire working surface. However, in order to utilize this advantage the carbon dioxide protected arc must be kept short to avoid spattering. In this form however the result is an over-narrow and over-deep melting-out of the basic material. Then seams and cracks result and in addition the penetration depth can be greatly altered due to small form errors in the seam, so that a uniform weld is difficult.

Thus, since the disadvantages of argon and carbon dioxide welding are attributable to contradictory factors, namely in argon welding to the over-flat lateral penetration and in carbon dioxide welding to the deep penetration, it was obvious to try welding with mixtures of the two gases. It has proved, however, that mixtures of only 15% carbon dioxide with argon assumed the character of the argon arc; a fine-particled, short circuit-free material transfer was no longer possible in a utilizable arc-length. With higher percentages of carbon dioxide, penetration and material transfer assumed the form of the pure carbon dioxide arc.

The purpose of the invention consists in combining the advantages of argon and carbon dioxide welding but eliminating their unfavorable effects.

According to the invention this is obtained by using, as protective gas, a mixture of three or more substances, comprising at least one inert gas and at least one strongly oxidizing gas and another gas which may be weakly oxidizing or weakly reducing and/or a halogen e.g. a mixture of argon, carbon dioxide, and oxygen. It has turned out, surprisingly, that an addition of oxygen stabilizes the arc which still burns free of short circuits only in argon-carbon dioxide mixtures containing 15% of carbon dioxide at the most. It has also turned out that even limited additions of oxygen to mixtures of carbon dioxide and argon favorably influence the penetration form, in welding technology, insofar as they expand the influence of the carbon dioxide arc and in the case of argon arcs the penetration effect in the seam is extended. Particularly favorable, from the point of view of welding technology is an A—$CO_2$—$O_2$ mixture with at least 8 to 10% $CO_2$ or CO or a mixture thereof, 3–15% $O_2$ and the rest argon or helium or a mixture thereof, which, can be supplied in the composition given, from a steel cylinder.

The effect sought for, which is a change in the current distribution in the arc atmosphere, can be further influenced by adding additional small quantities which may be only traces of well ionizable gases, vapors or dusts to the protective gas. For this purpose, for example noble gases with higher atomic weights than argon, e.g. krypton or xenon, or alkali, alkaline earth and rare earth elements as well as their salts and oxides and weakly radio-active substances with limited radius effect such as radium preparations. The quantities of these substances added should lie between 0.1 and 2% by volume, in the case of gases and between 0.05 and 0.5 g./liter or below in the case of solids.

The ionizing supplementary elements can be fed to the arc or its atmosphere simultaneously with the principal elements through separate means.

The use of additions of easily ionizable materials referred to above is a known expedient. For completeness it is noted that substances of this type include $SiCl_4$, $TiCl_4$, chlorosilanes such as methylchlorosilane and titanates of aliphatic hydrocarbons. The alkali, alkaline earth and rare earth elements include Li, Na, K, Rb, Cs, Mg, Ca, Sr, Ba, Ce, La, Y, Ir, Th, Zr and Re. These elements may be used in powdered form as such or as alloys with the electrode metal or in the form of their oxides or halogenides.

As the inert gas component of the composition argon is preferred but helium alone or mixtures of argon and helium may be used in the same proportion.

As the strongly oxidizing gas oxygen is preferred.

As the gas which may be either weakly oxidizing or weakly reducing $CO_2$ is preferred but CO alone may be used or mixtures of CO and $CO_2$.

The inert or noble gas constituent of the mixture e.g. argon or helium or a mixture thereof should constitute at least 20% of the mixture.

We claim:

1. Protective gas mixture for light arc welding with a melting bare metal electrode, especially steel welding, consisting essentially of Ar, $O_2$ and $CO_2$, characterized in that it consists of a mixture of 3–15% by volume $O_2$, at least 10% by volume $CO_2$ and the remainder pure Ar, and in that the mixture is supplied in a single steel container.

2. Protective gas according to claim 1, further characterized in that the $CO_2$ is replaced, in a manner known per se, at least partially with a halogen, for example, chlorine.

3. Protective gas according to claim 1, further characterized in that the $CO_2$ is replaced by a weak reducing gas, for example CO.

References Cited in the file of this patent
UNITED STATES PATENTS

| | | |
|---|---|---|
| 2,768,278 | Gaines | Oct. 23, 1956 |
| 2,852,659 | Belz | Sept. 16, 1958 |
| 2,863,981 | Thomas et al. | Dec. 9, 1958 |
| 2,919,341 | Roth | Dec. 29, 1959 |
| 2,947,847 | Craig et al. | Aug. 2, 1960 |

FOREIGN PATENTS

| | | |
|---|---|---|
| 791,347 | Great Britain | Feb. 26, 1958 |